May 26, 1931.   C. ROBERTS   1,806,985
DISPLAY MECHANISM
Filed July 19, 1928   3 Sheets-Sheet 1

Fig. 1.

INVENTOR.
CHARLES ROBERTS.
ATTORNEY.

May 26, 1931. C. ROBERTS 1,806,985
DISPLAY MECHANISM
Filed July 19, 1928 3 Sheets-Sheet 3

INVENTOR.
CHARLES ROBERTS.
ATTORNEY.

Patented May 26, 1931

1,806,985

UNITED STATES PATENT OFFICE

CHARLES ROBERTS, OF NEW YORK, N. Y.

DISPLAY MECHANISM

Application filed July 19, 1928. Serial No. 295,884.

This invention relates to a display mechanism and is designed more particularly for displaying advertising signs and the like.

One object of the invention is to provide a display mechanism which is simple in construction and easy to operate to successively display a large number of different signs.

A further object of the invention is to provide such a mechanism with a display frame adapted to carry different signs on the respective faces thereof and to alternately display the two signs.

A further object of the invention is to provide a display mechanism of such a character that the signs may be changed within a relatively small space, thus enabling the mechanism as a whole to be compact in its arrangement.

A further object of the invention is to provide such a mechanism which will have the strength and rigidity to withstand the jars and vibrations to which it is subjected when mounted on a motor vehicle, such as a bus.

A further object of the invention is to provide such a mechanism which will be free from endless belts and the operating mechanism of which will not require the use of sprocket chains or the like.

Other objects of the invention will appear as the mechanism is described in detail.

In the accompanying drawings

In these drawings I have illustrated one embodiment of my invention but it will be understood that this particular embodiment has been chosen for the purposes of illustration only and that the mechanism may take various forms and may be arranged in various ways without departing from the spirit of the invention.

In that particular embodiment of the invention here illustrated the mechanism as a whole is enclosed within a housing 6 having in its front wall a sight opening 7 through which the signs which are moved to display position may be seen. The mechanism as a whole may consist of one or more display units, each unit comprising a series of display frames, adapted to carry the signs, and to present those display frames successively in display position in line with the sight opening 7. When a plurality of display units are employed the signs carried by the display frames of the several units may be entirely distinct one from the other, so that several signs will be simultaneously displayed through the sight opening, or those signs of the several units which are simultaneously displayed may be combined to form a single advertisement or complete sign. In the present instance, the mechanism comprises three display units which are identical in construction and operation. However, I prefer to provide a single operating mechanism for all the units, to insure the movement of the display frames in synchronism.

In the present construction I have mounted within the housing 6, near the respective sides thereof, supporting members or guide plates 8 which are rigidly secured in upright positions parallel one with the other. These guide members are provided with a series of slots to control the movements of the display frames. As here shown, a single guide member 8 at each side of the mechanism is provided with slots or guideways for the several display units but obviously this is not essential so long as the guide members are mounted in fixed position with relation to their respective units. In the particular arrangement here shown, the guideways for each display unit comprise an upper and lower horizontal guideway or slot 9 and 10, respectively, front and rear vertical slots or guideways 11 and 12, respectively, communicating at their upper and lower ends with the horizontal guideways. An intermediate slot or guideway 13 extends from the lower horizontal guideway 10 upwardly to a point near the upper horizontal guideway but does not communicate with that guideway. A forwardly and downwardly inclined or curved guideway 14 leads from the upper end of the intermediate guideway 13 to the front vertical guideway 11, at a point between the upper and lower ends of the latter. The guideways may be formed in any suitable manner but, in the present instance, in which the guideways are in the form of slots extending through the guide plates, the inner portion of the plates, which form the inner walls of the guideways, are supported by brackets or yokes 15 so as to maintain them rigidly in their proper relation to the main plate 8.

Each display unit includes a series of display frames, in the present instance eight. Each of these display frames, as shown at 16, consists of a substantially rectangular structure having means, such as clips 17, to attach advertising cards or the like thereto and each is provided at its ends and near the respective longitudinal edges thereof with longitudinally extending projections or pins 18 and 19 which extend into the respective slots and control the position of the display frame during its several movements. The rear portion of the unit constitutes a magazine in which all the display frames except the one which is on display position are stored, and when in stored position the respective pins of the display frames are retained within the rear front slot 12 and the intermediate vertical slot 13 and are supported therein by spring actuated detents 20 having their lower ends beveled to permit the pins to pass the same and adapted to engage beneath the pins as soon as the latter have passed the same and thus support the several display frames in their normal or idle positions.

Figure 1:
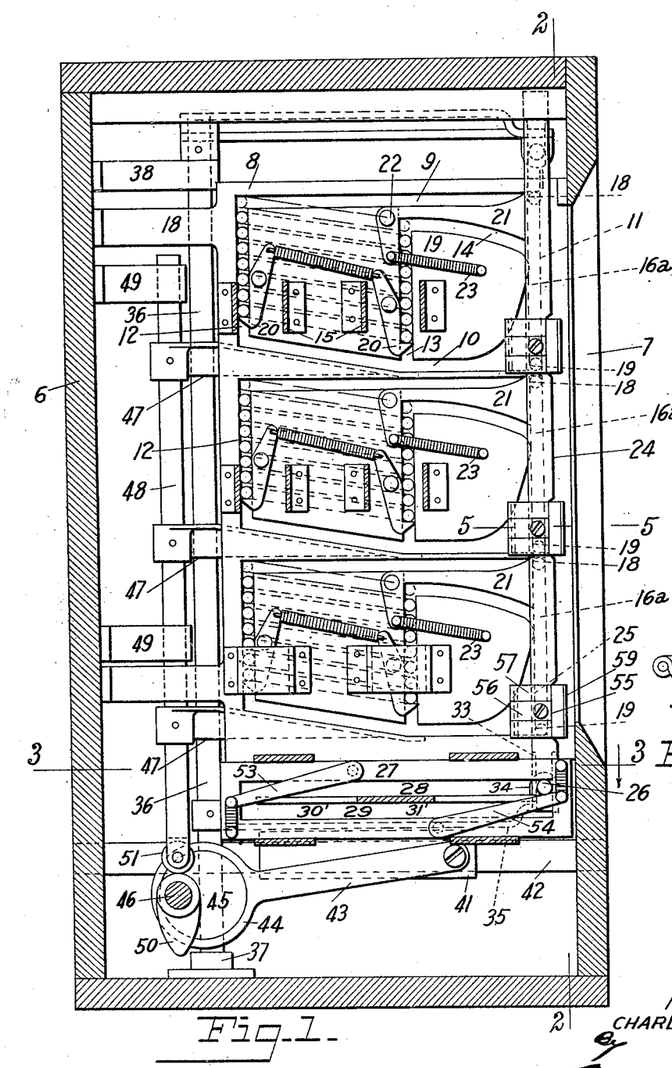
Fig. 1 is a transverse vertical sectional view of a machine embodying my invention, showing the mechanism in elevation.
Figure 2:
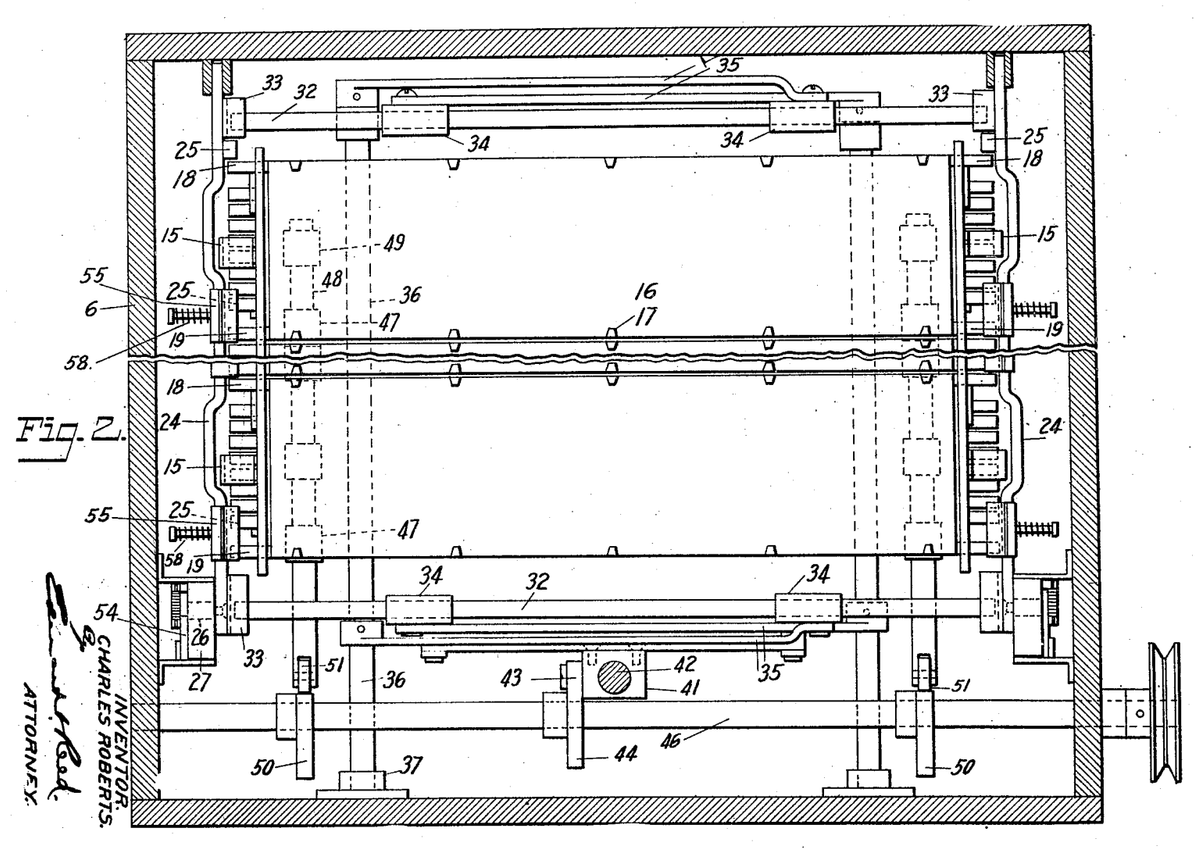
Fig. 2 is a section taken on the line 2—2 of Fig. 1 and partly broken away.
Figures 3, 4:
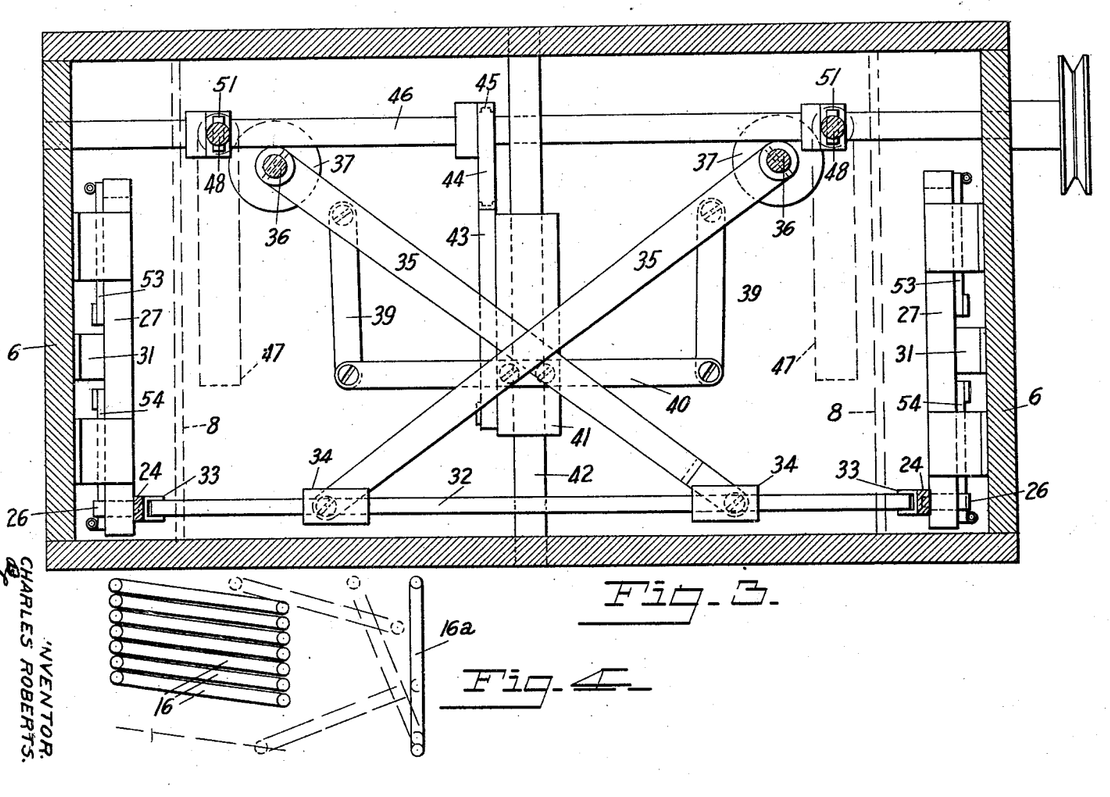
Fig. 3 is a transverse section taken on the line 3—3 of Fig. 1, looking in the direction of the arrows.
Fig. 4 is a diagrammatic view showing successive positions of the display frame.
Figure 5:
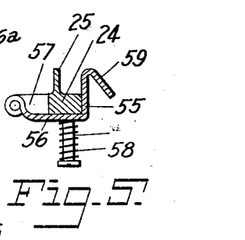
Fig. 5 is a sectional detail view of one of the actuating devices taken on the line 5—5 of Fig. 1.

When there is no display frame in display position and the entire number of display frames is supported in the slots 12 and 13, the uppermost frame will be supported with its rear pins 18 in line with the upper horizontal slot 9 and its forward pins 19 in line with the downwardly curved slot 14, as shown in dotted lines in Fig. 1. In the operation of the device pressure is applied to the uppermost display frame, preferably to the ends of the pins which project beyond the guide plates, to move the display frame forward, thus causing the pins 18 to travel in the slots 9 and the pins 19 to travel in the slots 14 until they enter the vertical slot 11 and to then move downwardly in that vertical slot while the pins 18 continue their forward movement and enter the upper end of the vertical slot 11, thereby placing the display frame in a display position in line with the sight opening 6. Preferably the upper horizontal slot is provided with a detent 21 pivotally mounted on the guide plate at 22 and acted upon by a spring 23 to hold it normally in an operative position. The rear edge of the detent is inclined so that it will yield and permit the passage of the pins 18 into the vertical slot 11 but as soon as the pins have passed it springs into its operative position and prevents the pins from again entering the slot 9. It may be noted here that the display frames have movement in a forward direction only throughout their operation. After the display frame has remained in display position for the designed length of time it is withdrawn from that position preferably by applying pressure to the lower pins 19, and causing those pins to travel rearwardly, thus drawing the upper pins 18 downwardly and causing the display frame to again assume a horizontal position. The rearward movement of the display frame is continued until the pins are brought in line respectively with the slots 12 and 13 and upward pressure is then applied to the frame to force the pins past the yieldable detents 20 and lift the uppermost display frame in the magazine into its initial operative position, that is, with its pins in line with the respective slots 9 and 14. The cycle of operations is then repeated and the several display frames are moved successively into display position. It will be noted that as the display frame is withdrawn from display position that face thereof which was on display is lowermost. Consequently as this display frame is moved upwardly through the magazine and again brought into display position the opposite face thereof will be forward. In this manner the two faces of the display frame are alternately displayed and by providing the two faces of each frame with different signs double the number of signs may be displayed by the mechanism.

The operating mechanism may take various forms but I prefer to provide actuating devices to engage the pins at the upper and lower sides of each display unit and to move said display frames first in one direction then in another. In order to secure uniformity of movement of all the display signs the several actuating devices may be connected one to the other in a single operating mechanism. As here shown, the operating mechanism comprises two upright standards 24 arranged at the respective sides of the mechanism and extending for the height of the three display units. These standards are mounted for transverse movement and for a limited vertical movement. Carried by each standard is an actuating device adapted to engage corresponding pins of the respective display frames and impart movement thereto when the standards are moved transversely. In the present construction these actuating devices are in the form of channels or U-shaped portions 25 on the inner sides of the respective standards, the channels being open at their upper and lower ends to permit them to be moved into and out of engagement with the pins of the display frames. Each standard has at its lower end an outwardly projecting part or pin 26 which is adapted to travel in a guideway formed in a guide member or plate 27 supported in the lower portion of the housing 6. Preferably this guideway comprises upper and lower parallel slots 28 and 29 separated by a partition 30 carried by a bracket 31 on the housing 6. This partition is of less length than the slots, thereby providing communication between the upper and lower slots at each end thereof. Rods 32 extend between the standards 24 near the upper and lower ends thereof and are so connected therewith as to impart transverse movement to the standards. In the present instance, the standards are provided with U-shaped guides 33 to receive the ends of the rods 32 and thus permit the standards to have vertical movement with relation thereto. Slidably mounted on each rod 32 are two sleeves 34 with which are pivotally connected the forward ends of a pair of intersecting levers 35, the rear ends of these levers being rigidly secured to vertical shafts 36 mounted in bearings 37 and 38 in the housing 6. The lower pair of intersecting levers 35 is connected by links 39 with a cross bar 40 which is rigidly secured to a block 41 slidably mounted on a rod 42 mounted at its ends in the front and rear walls of the housing 6. Pivotally connected with the slide block 41 is a pitman 43 the rear end of which has a bearing strap 44 which embraces an eccentric disk 45 rigidly secured to a transverse shaft 46 journaled in suitable bearings carried by the housing.

Arranged beneath each display unit is a lifting device to engage the display frame which has been withdrawn from display position and move the same upwardly into the magazine. As here shown, each lifting device comprises a pair of arms 47 rigidly secured to vertical plungers 48 slidably mounted in bearings 49. The plungers are actuated by cams 50 secured to the shaft 46 and acting on rollers 51 carried by the lower ends of the respective plungers. The lifting arms 47 have their upper edges sloped forwardly and arranged adjacent to the lower edge of the rear portion of the lower horizontal slots 10 of the respective display units so that they will move the display frame to a slightly inclined position and properly locate the same in the magazine.

With the parts in the positions shown in the drawings there is a display frame in display position in each unit, as shown in dotted lines at 16a. The actuating devices 25 are in engagement with the lower pins 19 of those display frames. The operating mechanism is driven intermittently so as to permit the display frames to remain in display position for a predetermined interval of time. The means for securing this intermittent operation forms no part of the present invention and is not here illustrated. It may be of any suitable character. When movement is imparted to the operating mechanism the eccentric will move the slide block 21 rearwardly and this will carry with it the upright standards 24 of the operating mechanism. Because of the arrangement of the intersecting arms 35 the standards will be moved a distance materially greater than the distance that the slide block is moved. As the standards and their actuating devices move rearwardly the lower pins 19 of the respective display frames will be carried rearwardly along the slots 10 and the upper pins 18 will be moved downwardly through the vertical slots 11 until the display frames have assumed substantially horizontal positions in the lower portions of the respective display units. The rearward movement of the display frames is continued until the pin 19 is brought into line with the rear vertical slot 12 and the pin 18 is brought into line with the intermediate vertical slot 13. It will be noted here that as above explained, the positions of the display frames when withdrawn from display position are reversed. When the pins are in proper alinement with the respective vertical slots the cams 50 will actuate the plungers 48 and lifting devices 47 to move the display plates into the respective magazines, force the same past the yieldable detents 20 and thus lift the uppermost display frame in the magazine into its initial operative position, as shown in dotted lines in Fig. 1. At the same time the pins 26 of the operating standards will be moved downwardly into the lower slots 29 of their guideways. The weight of the standards would ordinarily effect this shifting of the pins from one slot to another but, as here shown, a spring actuated shifting device of pawl 53 extends across the rear end of each slot 28 so that it will be engaged by the pin and will force the pin downwardly when it is moved into line with the communicating space between the two slots. This lifting of the display frames and the downward shifting of the operating standards takes place while the axis of the eccentric is passing its horizontal center, at which time little or no movement is imparted to the slide block 41. The downward movement of the actuating standards, which are now near the rear ends of the display units, will move the actuating devices out of engagement with the pins of the withdrawn display frames and will move the same into operative engagement with the pins of the display frames which are in their initial operative positions and are ready to be moved into display position. In the present instance, where there are three display units the two intermediate actuating devices will serve to withdraw the display frame of the upper units and will then move into operative engagement with the display frames of the next lower units, so that on the rearward movement of the operating mechanism these actuating devices withdraw the display frame of one unit and upon the forward movement of the operating mechanism they actuate a display frame of the lower unit. The actuating devices at the top of the upper display unit are inoperative upon the rearward movement of the operating mechanism but engage the pins of the uppermost display frame of that unit when the operating mechanism has been moved to its lowermost position. The actuating devices below the lowermost display unit operate to withdraw the display frame of that unit and after they are disconnected therefrom are idle during the forward movement of the operating mechanism. When the operating mechanism has been lowered and the several actuating devices are in operative engagement with the rear pins of the upper display frames of the respective units the eccentric will impart forward movement to the operating standards, thus carrying the display frames forwardly along the slots 9, 14 and 11, as above described, and causing the uppermost frames to assume display positions. As the operating standards approach their foremost positions the pins thereof are engaged by spring pressed pawls or shifting devices 54 which lift the pins into the upper guide slots 28 and also lift the actuating devices out of engagement with the upper pins of the several display frames and cause the actuating devices, with the exception of the uppermost one, to engage the lowermost pins of the respective display frames so that the device is then ready to withdraw these display frames after the interval of display.

As the display frames are moved into their vertical or display positions the lower pins 19 will be moved into line with the respective actuating devices before these actuating devices have completed their forward movement and in order that the pins may enter the actuating devices I have provided each of the three lowermost actuating devices with a yieldable side wall, as shown at 55. In the construction illustrated this side wall is carried by an arm 56 which is pivotally mounted at its rear end between lugs 57 extending rearwardly from the standard 24 and is actuated by a spring 58 to hold the same normally in its operative position. The free edge of the side wall 55 is bent forwardly and laterally, as shown at 59, to provide an inclined surface which will engage the pin of the display frame and thus move the side wall laterally to permit it to pass that pin.

While I have shown and described one embodiment of my invention I wish it to be understood that I do not desire to be limited to the details thereof as various modifications may occur to a person skilled in the art.

Having now fully described my invention, what I claim as new and desire to secure by Letters Patent, is:

1. In a display mechanism, a movable display frame, means to support said display frame initially in a substantially horizontal position and to guide the same in its movement, means movable in one direction to impart movement to said display frame and to cause the same to assume an upright position, and means movable in another direction to withdraw said display frame from said upright position and restore the same to a horizontal position.

2. In a display mechanism, a movable display frame, means to support said display frame initially in a substantially horizontal position and to guide the same in its movement, forwardly movable means to engage a part of said frame and move the same from said horizontal position to an upright position, and rearwardly movable means to engage another part of said frame and move the same from said upright position to a horizontal position.

3. In a display mechanism, a movable display frame, means to support said display frame initially in a substantially horizontal position and to guide the same in its movement, forwardly movable means to engage a part of said frame and move the same from said horizontal position to an upright position, rearwardly movable means to engage another part of said frame and move the same from said upright position to a horizontal position, and other means for then moving said frame to a position to be again engaged by said forwardly movable means.

4. In a display mechanism, a plurality of movable display frames, means to guide said display frames, means to support said display frames normally in an upright stack with each frame in a substantially horizontal position, means to impart forward movement to the frame at one end of said stack and cause the same to assume a substantially vertical display position, and other means to withdraw said display frame from said display position and move the same into a substantially horizontal position at the other end of said stack.

5. In a display mechanism, a plurality of movable display frames, means to guide said display frames, means to support said display frames normally in superimposed positions, means to impart forward movement to the uppermost display frame and cause the same to assume a substantially vertical display position, other means to withdraw said display frame from said display position and move the same into a position beneath said plurality of display frames, and means to elevate said plurality of display frames to bring the display frame which is then uppermost into a position to be actuated by the first mentioned means.

6. In a display mechanism, a supporting structure having guideways at the respective ends thereof, a display frame having at each end thereof a plurality of parts to travel in said guideways, said guideways being arranged to support said frame initially in a substantially horizontal position, means acting on the rearmost parts of said frame to move said frame forwardly and to cause the same to assume an upright position, and means acting on the foremost parts of said frame to move the same rearwardly and cause said frame to move from said display position to a substantially horizontal position.

7. In a display mechanism, a supporting structure having guideways at the respective ends thereof, a display frame having at each end thereof a plurality of parts to travel in said guideways, said guideways being arranged to support said frame initially in a substantially horizontal position, means acting on the rearmost parts of said frame to move said frame forwardly and to cause the same to assume an upright position, means acting on the foremost parts of said frame to move the same rearwardly and cause said frame to move from said display position to a substantially horizontal position below said initial horizontal position, and means to elevate said frame to a position to be again engaged by the first mentioned means.

8. In a display mechanism, a supporting structure having at each end thereof a series of guideways, a display frame having at each end thereof a plurality of parts to travel in different guideways, and means to actuate said display frame, said guideways being so arranged that said display frame will occupy initially a substantially horizontal position, will be moved from said horizontal postion to a substantially vertical display position and will be then withdrawn from said display position and caused to assume a substantially horizontal position.

9. In a display mechanism, a supporting structure having at each end thereof a series of guideways, a display frame having at each end thereof a plurality of parts to travel in different guideways, and means to move said display frame along said guideways, said guideways being so arranged that said display frame will occupy initially a substantially horizontal position and when actuated by said means will be moved forwardly from said horizontal position, its forward end depressed as its rear end travels in a horizontal direction to cause said display frame to assume an upright position and its forward end then moved rearwardly while its rear end moves downwardly to restore said frame to a substantially horizontal position.

10. In a display mechanism, a supporting structure having at each end thereof a series of communicating guideways, a part of said guideways being arranged vertically to form a magazine, a plurality of display frames having parts to travel in said guideways, means to retain the several display frames in superimposed positions in said magazine with the uppermost frame in a position to be actuated, means for imparting movement to said uppermost frame, said guideways being so arranged that movement imparted to said uppermost frame will cause the same to assume an upright display position in front of said magazine and will then cause said frame to be withdrawn from display position and positioned beneath said magazine, and means for moving said frame into said magazine and causing another of said frames to be moved into a position to be actuated.

11. In a display mechanism, a supporting structure having in each end thereof upper and lower substantially horizontal slots, front and rear substantially vertical slots communicating with said upper and lower slots, and also having substantially vertical intermediate slots leading from the lower horizontal slot to a point adjacent to but spaced from the upper horizontal slot, and a connecting slot leading from the upper end of said intermediate slot to the front vertical slot between the upper and lower ends thereof, a plurality of display frames having at their respective ends projections adapted to enter and travel in said slots, means for supporting said plurality of display frames in superimposed positions in the rear and intermediate vertical slots, the uppermost display frame having pins near the forward edge thereof in line with said connecting slot and having pins near the rear edge thereof in line with the upper horizontal slot, means for moving said display frame forwardly and causing said pins to enter the forward vertical slot and support said display frame in display position, means for moving the lower pins of said display frame rearwardly to withdraw the latter from display position and to position the pins respectively beneath said rear vertical slot and said intermediate slot, and means to lift said display frame into said vertical slots and to elevate another display frame to a position to be actuated.

12. In a display mechanism, a supporting structure having a series of guideways, a display frame having parts to travel in said guideways, said guideways being arranged to guide said display frame forwardly and downwardly from a substantially horizontal position to an upright position and downwardly and rearwardly from said upright position to a substantially horizontal position, and reciprocatory actuating devices movable in unison and arranged to be alternately moved into operative engagement with said display frame and impart operative movements thereto.

13. In a display mechanism, a supporting structure having a series of guideways, a display frame having longitudinal projections near the front and rear edges thereof to travel in said guideways, actuating devices to engage said projections at the rear edge of said display frame to move the same to an upright display position, a second actuating device to engage the projections at the front edge of said display frame when the latter is in display position and move the same to a substantially horizontal position, and means for operating said actuating devices in unison and for causing one actuating device to be moved to an inoperative position when the other actuating device is moved to an operative position.

14. In a display mechanism, a supporting structure having a series of guideways, a plurality of display frames arranged normally in substantially horizontal positions one above the other and each having longitudinal projections near its front and rear edges to travel in said guideways, an operating member mounted for transverse reciprocatory movement and for a limited vertical movement, an actuating device carried by said operating member and arranged to engage the projections at the rear edge of the uppermost display frame when said operating member is in its rearmost and lower position and to move said display frame to an upright position when said operating member is moved in one direction, and a second actuating device carried by said operating member and arranged to engage the projection at the front edge of said display frame when the latter is in display position and said operating member is in its foremost and upper position and to withdraw said display frame from said display position to a substantially horizontal position when said operating member is moved in the other direction, and means to impart operative movement to said operating member.

15. In a display mechanism comprising a supporting structure having near each side thereof a series of guideways, a plurality of display frames supported normally in substantially horizontal positions one above the other and each having longitudinally extending projections near the front and rear edges thereof to travel in said guideways, an operating mechanism comprising upright members supported at the respective sides of said supporting structure for fore and aft reciprocatory movement and for a limited vertical reciprocatory movement, actuating devices carried by said operating members and so arranged that when said operating members are in their rearmost positions the downward movement thereof will cause said actuating devices to operatively engage the respective projections at the rear edge of the uppermost display frame and the forward movement of said operating members will cause said display frame to be moved to an upright display position, other actuating devices carried by said operating members and so arranged that when said display frame is in display position and said operating members are in their foremost positions the upward movement of said operating members will cause said other actuating devices to engage the respective projections at the front edge of said display frame and the rearward movement of said operating members will move said display frame from its display position to a substantially horizontal position beneath the other display frames, and means for imparting said movements to said operating members.

16. In a display mechanism comprising a supporting structure having near each side thereof a series of guideways, a plurality of display frames supported normally in substantially horizontal positions one above the other and each having longitudinally extending projections near the front and rear edges thereof to travel in said guideways, an operating mechanism comprising upright members supported at the respective sides of said supporting structure for fore and aft reciprocatory movement and for a limited vertical reciprocatory movement, actuating devices carried by said operating members and so arranged that when said operating members are in their rearmost positions the downward movement thereof will cause said actuating devices to operatively engage the respective projections at the rear edge of the uppermost display frame and the forward movement of said operating members will cause said display frame to be moved to an upright display position, other actuating devices carried by said operating members and so arranged that when said display frame is in display position and said operating members are in their foremost positions the upward movement of said operating members will cause said other actuating devices to engage the respective projections at the front edge of said display frame and the rearward movement of said operating members will move said display frame from its display position to a substantially horizontal position beneath the other display frames, means for imparting said movement to said operating members, and other means to move said display frame into contact with the lowermost of said other display frames and elevate all of said display frames to move the uppermost thereof into a position to be actuated.

17. In a display mechanism comprising a supporting structure having near each side thereof a series of guideways, a plurality of display frames supported normally in substantially horizontal positions one above the other and each having longitudinally extending projections near the front and rear edges thereof to travel in said guideways, an operating mechanism comprising upright members supported at the respective sides of said supporting structure for fore and aft reciprocatory movement and for a limited vertical reciprocatory movement, actuating devices carried by said operating members and so arranged that when said operating members are in their rearmost positions the downward movement thereof will cause said actuating devices to operatively engage the respective projections at the rear edge of the uppermost display frame and the forward movement of said operating members will cause said display frame to be moved to an upright display position, other actuating devices carried by said operating members and so arranged that when said display frame is in display position and said operating members are in their foremost positions the upward movement of said operating members will cause said other actuating devices to engage the respective projections at the front edge of said display frame and the rearward movement of said operating members will move said display frame from its display position to a substantially horizontal position beneath the other display frames, guideways arranged adjacent to the lower ends of the respective operating members and comprising upper and lower communicating slots, projections carried by the respective operating members to travel in said guideways, and means for causing the last mentioned projections to move first through one of said slots and then through the other.

18. In a display mechanism comprising a supporting structure having near each side thereof a series of guideways, a plurality of display frames supported normally in substantially horizontal positions one above the other and each having longitudinally extending projections near the front and rear edges thereof to travel in said guideways, an operating mechanism comprising upright members supported at the respective sides of said supporting structure for fore and aft reciprocatory movement and for a limited vertical reciprocatory movement, actuating devices carried by said operating members and so arranged that when said operating members are in their rearmost positions the downward movement thereof will cause said actuating devices to operatively engage the respective projections at the rear edge of the uppermost display frame and the forward movement of said operating members will cause said display frame to be moved to an upright display position, other actuating devices carried by said operating members and so arranged that when said display frame is in display position and said operating members are in their foremost positions the upward movement of said operating members will cause said other actuating devices to engage the respective projections at the front edge of said display frame and the rearward movement of said operating members will move said display frame from its display position to a substantially horizontal position beneath the other display frames, the last mentioned actuating devices comprising yieldable parts to permit said projections to enter the same when said actuating devices are moved to their foremost position.

19. In a display mechanism, a plurality of display frames supported normally in substantially horizontal positions one above the other, operating mechanism comprising upright members mounted at the respective ends of said display frames for fore and aft reciprocatory movement and for vertical movement, actuating devices carried by said operating members and movable into and out of operative engagement with different parts of one of said display frames by the movements of said operating members, guides arranged near the lower ends of said operating members and having upper and lower communicating guideways, lateral projections carried by the respective operating members to travel in said guideways, and means to cause said projections to travel in one direction in one of said guideways and to travel in the other direction in the other of said guideways.

20. In a display mechanism, a plurality of display frames supported normally in substantially horizontal positions one above the other, operating mechanism comprising upright members mounted at the respective ends of said display frames for fore and aft reciprocatory movement and for vertical movement, actuating devices carried by said operating members and movable into and out of operative engagement with different parts of one of said display frames by the movements of said operating members, guides arranged near the lower ends of said operating members and having upper and lower communicating guideways, lateral projections carried by the respective operating members to travel in said guideways, means to impart fore and aft reciprocatory movement to said operating members, and means to positively shift said projections from one guideway to the other.

21. In a display mechanism, a plurality of display frames supported normally in substantially horizontal positions one above the other, operating mechanism comprising upright members mounted at the respective ends of said display frames for fore and aft reciprocatory movement and for vertical movement, actuating devices carried by said operating members and movable into and out of operative engagement with different parts of one of said display frames by the movements of said operating members, guides arranged near the lower ends of said operating members and having upper and lower communicating guideways, lateral projections carried by the respective operating members to travel in said guideways, a rod connected with said operating members, sleeves slidably mounted on said rods, intersecting levers each pivotally connected at one end with one of said sleeves and mounted on a fixed axis at the other end, a reciprocatory member operatively connected with said intersecting levers, and means for actuating said reciprocatory member.

22. In a display mechanism, a plurality of display units each comprising a plurality of display frames supported normally one above the other in substantially horizontal positions, and guideways to guide said display frames successively from said horizontal position to an upright display position and then to a substantially horizontal position beneath the other display frames, operating mechanism comprising upright members arranged at the respective ends of the several display units, a plurality of actuating devices carried by said operating members, a part of said actuating devices being arranged to operatively engage the rear edges of said uppermost display frames of each display unit and move the same to an upright display position when said operating members are moved forwardly and to engage the forward edges of the display frames of the adjacent display units which are in display position and move said display frames from display position to substantially horizontal positions, and means for imparting operative movement to said operating members.

23. In a display mechanism, a plurality of display units each comprising a plurality of display frames supported normally one above the other in substantially horizontal positions, and guideways to guide said display frames successively from said horizontal position to an upright display position and then to a substantially horizontal position beneath the other display frames, operating mechanism comprising upright members arranged at the respective ends of the several display units, a plurality of actuating devices carried by said operating members, a part of said actuating devices being arranged to operatively engage the rear edges of said uppermost display frames of each display unit and move the same to an upright display position when said operating members are moved forwardly and to engage the forward edges of the display frames of the adjacent display units which are in display position and move said display frames from display position to substantially horizontal positions, means for imparting operative movement to said operating members, lifting devices arranged beneath each display unit to elevate the display frame which has been withdrawn from said display position, and means for simultaneously operating said lifting devices.

24. In a display mechanism, a movable display frame, means to support said display frame initially in a substantially horizontal position and to guide the same in its movement, and actuating means comprising reciprocatory parts to move said display frame from said horizontal position to an upright position and to then withdraw said display frame from said upright position and move it to a substantially horizontal position.

25. In a display mechanism, a plurality of display units arranged one above the other and each comprising a plurality of display frames, and means for simultaneously actuating a single display frame in each of said units to move said frames into display position one above the other, substantially in a common plane, and to withdraw the same from said display positions.

26. In a display mechanism, a plurality of display units arranged one above the other and each comprising a series of display frames and having guideways to guide said frames successively into display positions, in which positions the frames of the several units will be supported one above the other substantially in a common plane, and actuating mechanism common to all of said display units to simultaneously move a single display frame of each unit into display position and to then simultaneously withdraw said display frame from display position.

In testimony whereof, I affix my signature hereto.

CHARLES ROBERTS.